United States Patent [19]
Dailey et al.

[11] Patent Number: 5,857,648
[45] Date of Patent: Jan. 12, 1999

[54] PRECISION DEPLOYABLE BOOM ASSEMBLY

[75] Inventors: Dean R. Dailey, Torrance; Larry N. Gilman, Inglewood; A. Dale Parker, Rolling Hills Estates, all of Calif.

[73] Assignee: TRW Inc., Redondo Beach, Calif.

[21] Appl. No.: 789,146

[22] Filed: Jan. 28, 1997

[51] Int. Cl.⁶ .................................................. B64G 1/66
[52] U.S. Cl. ........................ 244/158 R; 52/109; 52/121
[58] Field of Search .............................. 244/158 R, 159; 52/109, 111, 121

[56] References Cited

U.S. PATENT DOCUMENTS

| | | | |
|---|---|---|---|
| 370,833 | 10/1887 | Van Order | 52/109 X |
| 418,827 | 1/1890 | St. Marie . | |
| 775,158 | 11/1904 | Wenig . | |
| 797,077 | 8/1905 | Shaw . | |
| 818,304 | 4/1906 | Shaw | 52/109 X |
| 836,868 | 11/1906 | Dangerfield . | |
| 967,116 | 8/1910 | Dupuis | 52/109 |
| 1,003,967 | 9/1911 | Magliocca | 52/109 X |
| 1,025,972 | 5/1912 | Geisel . | |
| 1,078,759 | 11/1913 | Wichertjes . | |
| 1,113,158 | 10/1914 | Hale | 52/109 X |
| 1,708,113 | 4/1929 | Allen | 52/109 X |
| 2,363,784 | 11/1944 | Gerich . | |
| 3,496,687 | 2/1970 | Greenberg et al. | 52/109 |
| 3,588,050 | 6/1971 | Black et al. . | |
| 4,237,662 | 12/1980 | Kinzler . | |
| 4,337,560 | 7/1982 | Slysh . | |
| 4,480,415 | 11/1984 | Truss | 52/121 X |
| 4,524,552 | 6/1985 | Hujsak . | |
| 4,529,063 | 7/1985 | Kishi . | |
| 4,555,585 | 11/1985 | Behrens et al. . | |
| 4,557,083 | 12/1985 | Zanardo . | |
| 4,725,025 | 2/1988 | Binge et al. . | |
| 4,850,161 | 7/1989 | McGinnis . | |
| 4,900,891 | 2/1990 | Vega et al. . | |
| 4,969,301 | 11/1990 | Warden | 52/111 X |
| 5,228,644 | 7/1993 | Garriott et al. . | |

FOREIGN PATENT DOCUMENTS 0408826  1/1991  European Pat. Off. .

*Primary Examiner*—William Grant
*Attorney, Agent, or Firm*—Michael S. Yatsko

[57] ABSTRACT

A precision deployable boom assembly 10 for terrestrial and celestial applications comprises an extendable and retractable boom 12 having a fixed end 14, a movable distal end 20 and three or more cables 30 attached to the distal end to form a tripod configuration of the deployed boom. The boom is spring biased to urge extension of the boom and to produce a tensile pre-load in the cables. The cables are wound and unwound by cable drums 28 selectively driven by precise motors such as stepping motors 33. The cables are preferably formed of graphite which provides high stiffness, light weight and a very low coefficient of thermal expansion. The position of the distal end is highly stable at all deployed lengths of the boom and is also precisely repeatable.

20 Claims, 8 Drawing Sheets

PRECISION DEPLOYABLE BOOM ASSEMBLY

BACKGROUND

The invention is directed to the field of deployable platforms and, more particularly, to a precision deployable boom assembly for celestial and terrestrial applications.

Deployable platforms are known for use on spacecrafts such as satellites. These platforms are utilized to support devices such as antennas, cameras, telescopes and various other scientific instruments.

Most deployable platforms are static and capable of only one-time deployment. These platforms are typically unfolded to the deployed position and cannot be retracted once deployed. Some platforms can be retracted. Neither the non-retractable nor the retractable platforms are stable at intermediate positions.

Known platforms are inadequate for applications that require a variable length platform. For example, to measure distant planets and solar systems, instruments can be mounted to a platform and the spacecraft rotated to map a full 360° C. revolution. For different aperture sizes, the distance between the spacecraft and the instruments needs to be varied. This variable positioning is not possible using known static platforms, which provide only a fixed platform length. Known platforms are also incapable of repeatedly positioning the boom at selected intermediate positions between retracted (stowed) and fully deployed with a high degree of accuracy and stability.

It is also necessary in some applications that the platform be extremely dimensionally and positionally stable. High stability is needed for making precise measurements or performing precise mapping using an instrument mounted to the platform. The stability of the platform can be significantly affected by temperature changes. In space, large temperature changes can occur, for example, during travel of satellites between the dark side and the sun side of their orbits. If the platform length is sensitive to temperature changes caused by thermal expansion or contraction, then the dimensional changes in the platform caused by the temperature change can alter the position of the instrument and prevent the instrument from providing precise measurement. Consequently, the mission is degraded at great expense.

The dimensional and positional stability of the platform can also be affected by "deadband" in the platform. Deadband is characterized as a lack of tightness in the platform due to excessive play between the platform members. Deadband causes the platform position to vary, significantly if there is a high amount of deadband in the platform. Consequently, the exact location of instruments mounted on platforms having deadband is indeterminate. In addition, deadband can interfere with the spacecraft control system and prevent the control system from correctly controlling motion of the spacecraft. The problem of spacecraft control is exacerbated in heavy booms having deadband.

Hysteresis in the platform can also affect positional stability. Hysteresis can be caused by the release of frictional loads in the platform, and by the elasticity of the platform members. A high stiffness is desired in the platform to reduce hysteresis and stabilize the platform length.

Another important characteristic of platforms is the natural structural frequency. The structural frequency can be represented by the frequency of lateral movement of the boom. If the structural frequency of the platform is too low, it can couple in with sensors that determine the attitude of the spacecraft and provide signals to thrusters or reaction wheels that control motion of the spacecraft. These sensors have a feedback loop frequency. If the structural frequency of the platform is too close to the feedback loop frequency, then it is not possible to determine whether the motion of the spacecraft is being controlled, or whether the thrusters or reaction wheels are actually just responding to vibrations of the platform and wasting precious fuel. Accordingly, it is desirable that the structural frequency of the platform differ by a safety margin from the feedback loop frequency of the sensors.

It is also important that a stiff platform be achieved without making the platform overly heavy. For spacecraft applications, the weight of the platform must be controlled for launch purposes and to minimize fuel consumption.

Thus, there is a need for a deployable boom assembly that (i) can be adjustably, repeatedly positioned at intermediate locations between retracted and fully deployed; (ii) is dimensionally stable despite changes in temperature; (iii) is positionally stable at all deployed positions; (iv) has a structural frequency that does not couple in with that of sensors that control the motion of spacecrafts; and (v) has a simple construction and is lightweight.

SUMMARY

The present invention provides a precision deployable boom assembly suitable for use on spacecrafts and also in terrestrial applications that satisfies the above needs. More specifically, the boom assembly (i) has a precisely adjustable length and can be repeatedly positioned at almost any intermediate location between retracted and fully deployed position; (ii) is subject to minimal linear thermal expansion or contraction over a wide range of temperatures; (iii) has substantially no deadband or hysteresis at any deployed position; (iv) has a structural frequency that does not interfere with the operation of sensors that control the motion of spacecrafts; and (v) has a high stiffness/weight ratio. In addition, the boom assembly has a simple construction and requires no active feedback loop to achieve precise positional control of the boom.

The precision deployable boom assembly according to the present invention comprises a deployable and retractable boom having a fixed end for fixedly securing to a surface of a supporting structure and a distal end selectively movable relative to the fixed end; at least three cables, each cable having one end connected to the distal end of the boom; and cable deployment means for securing to the supporting structure to selectively deploy and retract the cables during respective deployment and retraction of the boom. The boom assembly further comprises a deployment assist means for urging the boom to deploy and for producing a tensile pre-load force in each of the cables; and actuation means for actuating the cable deployment means to selectively vary the length of the cables deployed from the cable deployment means so as to vary the length of the boom between the fixed end and the distal end.

The boom assembly provides precise, repeatable deployment of the boom. Particularly, i) the distal end of the boom is positionable at substantially any position between fully deployed and fully retracted positions; ii) the distal end is repeatedly positionable at substantially any deployed position of the boom; and iii) the position of the distal end is substantially positionally stable at any deployed position.

The boom is preferably a scissors boom including strain energy hinges to assist in the deployment of the boom.

The boom assembly preferably comprises three cables and the cable deployment means preferably comprises three cable drums, with each of the cables secured at one end to one of the cable drums.

The cables are preferably formed of a stiff, low density material having a very low coefficient of thermal expansion. An excellent material for forming the cables is graphite. Graphite cables can be coated to selectively tailor the coefficient of thermal expansion to ultra low values.

The cable drums are preferably substantially symmetrically positionable relative to each other on the supporting structure such that the cables extend at approximately the same angle relative to the surface of the supporting structure between the cable drums and the distal end of the boom.

The actuation means preferably comprises three stepping motors drivingly connected to three cable drums. The actuation means can further comprise at least one position sensor for sensing the position of the distal end of the boom. The sensed position can be used to actuate the stepping motors to drive the cable drums.

DRAWINGS

These and other features, aspects and advantages of the present invention will become better understood from the following description, appended claims and accompanying drawings, where:

DESCRIPTION

Figure 1:
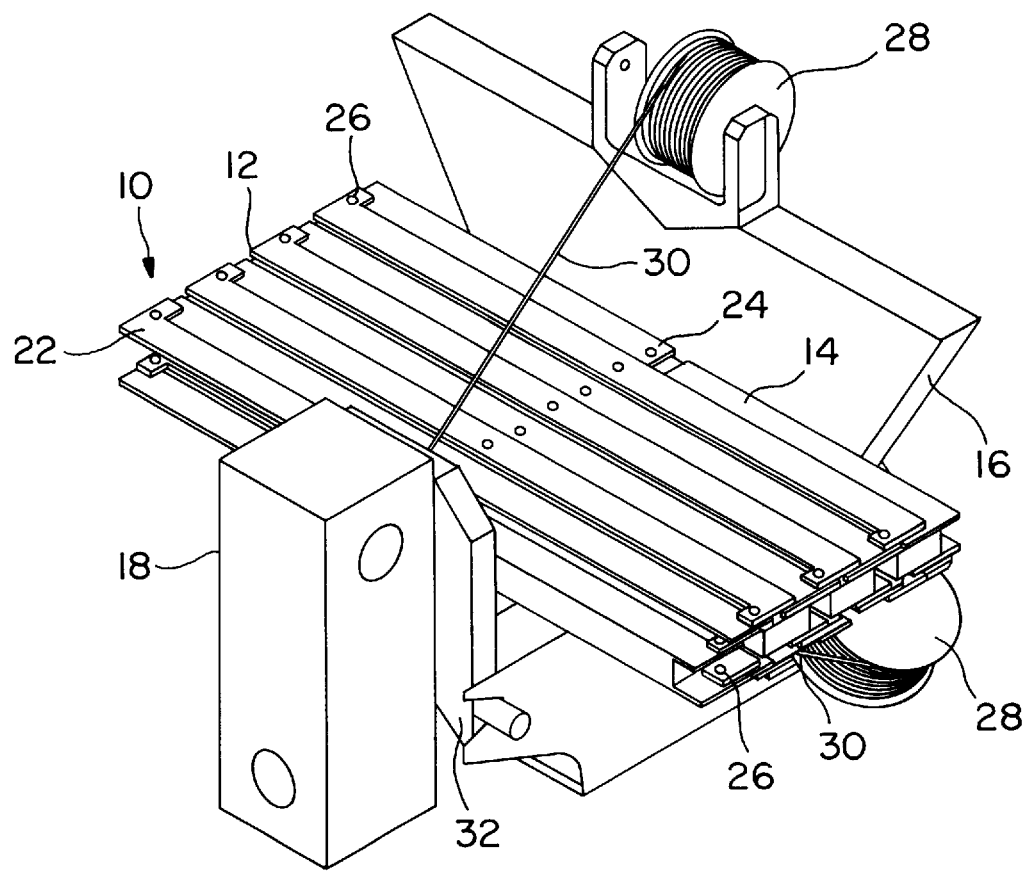
FIG. 1 is top perspective view of a stowed precision deployable boom in accordance with the invention showing one end of the boom mounted to a support structure and an interferometer mounted at the opposite end of the boom.
Figure 2:
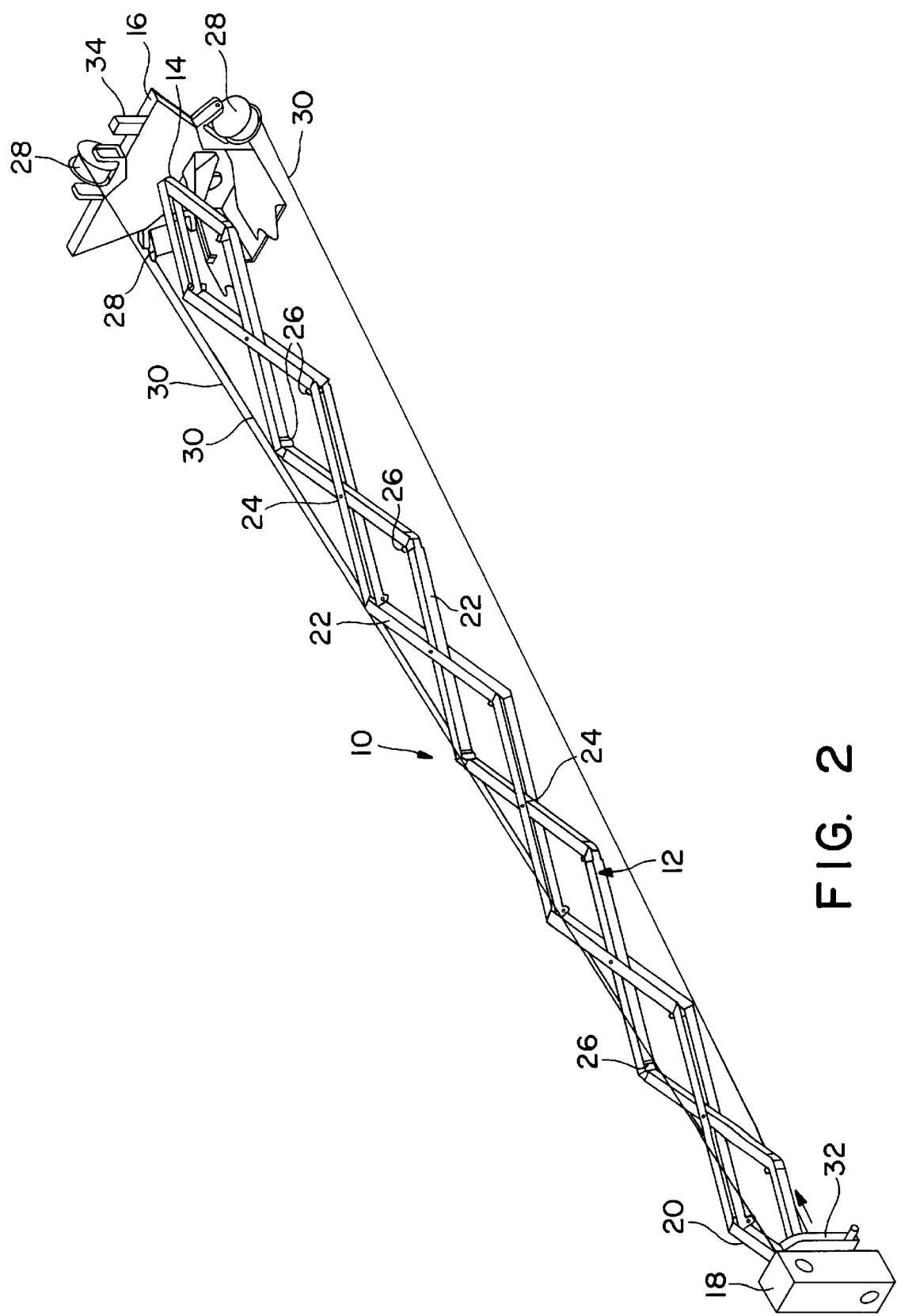
FIG. 2 is top perspective view of the deployable boom of FIG. 1 as fully deployed.
Figure 3:
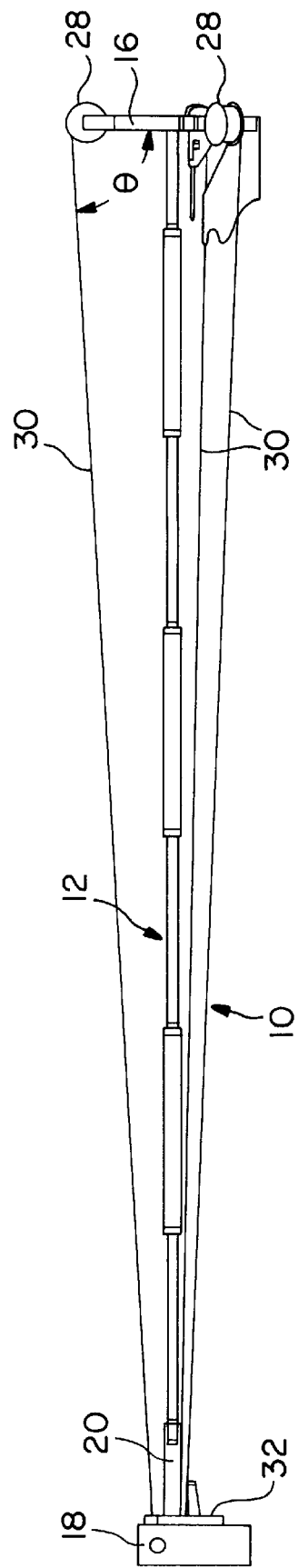
FIG. 3 is a side elevation view of the deployable boom of FIG. 1 as fully deployed.

With reference to FIGS. 1–3, the present invention is directed to a precision deployable boom assembly 10 suitable for use in celestial and terrestrial applications. FIG. 1 depicts the boom assembly 10 in the fully retracted (stowed) position. The boom assembly 10 comprises a boom 12 having a fixed end 14 mounted to a support structure 16. The illustrated support structure 16 is an optical bench suitable for mounting to a spacecraft. The boom assembly 10 can also be mounted to other types of support structures in various celestial and terrestrial applications. A device 18 such as an interferometer is mounted to the distal end 20 of the boom assembly 10. Other types of devices such as telescopes, scientific instruments, cameras, antennas and the like can be mounted to the distal end 20 of the boom 12 as well.

The illustrated boom 12 is known as a scissors boom. The boom 12 comprises a plurality of leg members 22 shown in the fully retracted condition in FIG. 1, and in the fully deployed condition in FIG. 2. The leg members 22 are interconnected by pins 24 and opposed ends of the leg members 22 are connected by hinges 26. The hinges 26 are preferably strain energy hinges each including a strain energy spring (not shown) to provide an extension force to urge the boom 12 to deploy outwardly away from the support structure 16. The use of springs in each hinge 26 provides a uniform load distribution to the boom 12 and reduces frictional loads in the hinges 26.

Optionally, a single deployment assist spring or other type of deployment assist means such as a hydraulic actuator (not shown) can be mounted at the fixed end 14 of the boom 12 to provide the extension force to deploy the boom 12.

The boom assembly 10 further comprises cable deployment means to selectively deploy and retract the cables 30 during respective deployment and retraction of the boom 12. The cable deployment means typically comprises a plurality of cable winding devices such as cable drums 28 mounted to the support structure 16. A cable 30 is attached to each cable drum 28. Operation of the cable drums 28 causes the cables 30 to be unwound and wound to respectively deploy and retract the boom 12.

The cable drums 28 are mounted to the support structure 16 at angularly spaced locations. As shown, the three cable drums 28 are typically symmetrically positioned at an angular spacing of about 120° relative to each other.

Referring to FIG. 3, the cables 30 each extend from the cable drums 28 at an angle $\theta$ relative to the support structure 16. This angle determines the axial and lateral components of the tension in the cables 30 and the angle can be selectively varied. Packaging constraints can limit the angle in spacecraft applications of the boom assembly 10.

The cables 30 are attached to the distal end 20 of the boom 12. The cables 30 can be attached directly to the boom 12 or, for example, to a mounting plate 32 of the device 18 as shown.

Figure 7:
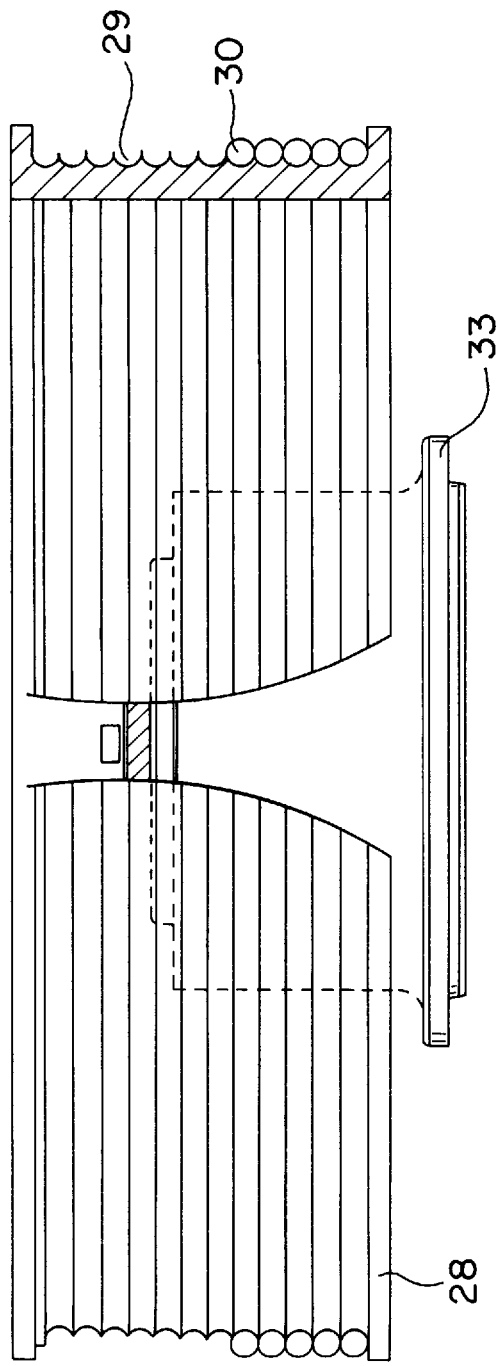
FIG. 7 illustrates a cable drum and an associated stepping motor for driving the cable drum.

The boom assembly 10 further comprises actuation means for actuating the cable drums 28 to selectively vary the length of the cables 30 deployed from the cable drums 28 to vary the deployed length of the boom 12. Referring to FIG. 7, the cable drums 28 are preferably each separately driven by an actuator including a stepping motor 33 and associated drive electronics (not shown). The stepping motors 33 provide precise payout and retraction of the cables 30 for precise positional control of the distal end 20 of the boom 12. The cable drums 28 are preferably precision manufactured such that the cable groove 29 is a continuous spiral having a substantially constant diameter along the groove 29. The cable drums 28 and the stepping motors 33 allow the device 18 to be moved axially in increments typically as small as about 20 microns, providing almost infinite axial adjustment of the device 18 to ensure its precise positioning. In addition, the device 18 can be selectively moved and precisely repositioned at other axial deployed positions or can be fully retracted. Furthermore, the device 18 can be repositioned repeatedly at substantially the same axial position.

Each cable drum 28 is preferably selectively, independently actuated by a stepping motor 33 to enable lateral positioning of the boom 12 and the device 18. Lateral adjustment of the boom 12 in increments as small as about 150 microns can typically be achieved with the boom assembly 10.

The actuation means of the boom assembly 10 can further comprise one or more position sensing or distance measuring devices such as an optical rangefinder 34 (FIG. 2) or the like, that precisely measures the location of the device 18. Such a device can also be incorporated to control the lateral position of the device 18. The rangefinder 34 determines the position of the device 18 and provides a signal to the actuator to drive the cable drums 28 to wind or unwind the cables 30 based on the sensed position. The signal can be inputted to the drive electronics of the stepping motors 33 to adjust the stepping motor 33 counts to provide even greater precision.

The boom assembly 10 preferably comprises three cables 30 and, accordingly, three cable drums 28 and stepping motors 33. The boom 12 and three cables 30 form a tripod configuration having high structural and dimensional stability. Less than three cables 30 do not provide the needed lateral support to the boom 12. More than three cables 30 provide the necessary lateral support, but introduce redundant load paths. In addition, redundant cables add undesired weight along with that of the required added cable drums and actuators to the boom assembly 10.

The boom 12 produces a tensile pre-load extension force in the cables 30 to stabilize the boom assembly 10. Various types of booms that provide this same function can optionally be used. For example, a telescoping tube system (not shown) can be substituted for the illustrated scissors boom 12 in some applications. Such a tube system is less preferred than the scissors boom 12, however, because although the tube system has high stability and stiffness at the fully extended position, it is less stable at intermediate positions. Accordingly, tube systems are well suited for applications of the boom assembly 10 that do not require intermediate positioning of the boom 12.

The tensile pre-load force in the cables 30 substantially eliminates deadband in the boom assembly 10. Any axial play in the leg members 22 of the boom 12 is countered by the tensile force in the cables 30 so that the deployed boom 12 length is highly stable. Consequently, the exact location of the device 18 mounted to the boom 12 is always precisely determinable. In addition, the elimination of deadband in the boom assembly 10 allows the spacecraft control system to effectively control the motion of the spacecraft without having to overcome the effects of deadband in the boom assembly 10.

The tensile force in the cables also eliminates hysteresis in the boom 12. That is, if a hinge joint 26 of the boom 12 unloads after the boom 12 is positioned at some location, the change in load resulting from the release of friction is insufficient to significantly change the length of the cables 30 and, accordingly, the position of the device 18 mounted to the boom 12.

The cables 30 act as structural members so long as the tensile pre-load force is applied to the cables 30 by the boom 12. The cables 30 are preferably formed of a material that has a high stiffness and a high stiffness/weight ratio, so that the high stiffness is not achieved by significantly increasing the weight of the boom assembly 10.

A high stiffness in the cables 30 provides several advantages. The cables 30 act as the primary structural members of the boom assembly 10 and, so, a high stiffness provides high structural stability to the boom assembly 10. A high stiffness also ensures high positional stability of the distal end 20 of the boom 12 and the mounted device 18.

An excellent material for forming the cables 30 that provides high stiffness and a high stiffness/weight ratio is graphite.

The cables preferably have a density of less than about 0.07 lb/in$^3$ and a coefficient of thermal expansion of an absolute value of less than about $0.01 \times 10^{-6}$ in/in-°F.

The cables 30 provide positional stability to the distal end 20 of the boom 12 and, so, it is important that the cables 30 are dimensionally stable. In celestial applications, for example, the temperature in space can vary significantly over the course of a spacecraft's orbit. Graphite has an extremely low coefficient of thermal expansion. For graphite cables 30, the coefficient of thermal expansion of the cables 30 is about $-0.01 \times 10^{-6}$ in/in-°F. Accordingly, even large temperature changes encountered by the boom assembly 10 produce minimal changes in the length of the cables 30.

In addition, any thermal expansion (or contraction) of the boom 12 is not imparted to the cables 30 because the resulting forces created in the boom 12 are insufficient in magnitude to overcome the tensile forces in the cables 30, and so the end of the boom 12 remains substantially fixed. This dimensional stability ensures that the position of the device 18 mounted to the boom 12 remains substantially fixed at all deployed positions of the boom 12.

To further reduce the coefficient of thermal expansion of the cables 30, the cables 30 can be formed by applying a suitable coating material such as nickel to graphite cables. The coating material preferably has a positive coefficient of thermal expansion. The resulting coefficient of thermal expansion of coated graphite cables can typically be selectively tailored to an absolute value of much less than about $0.05 \times 10^{-6}$ in/in-°F. The nickel-plated graphite cables are typically sheathed in a jacket of a material such as "DACRON".

The graphite cables 30 also provide for a sufficiently high natural structural frequency of the boom assembly 10 to prevent coupling in with spacecraft attitude sensors. Herein, the structural frequency is the frequency of lateral movement of the boom assembly 10. The structural frequency of the boom assembly 10 is typically greater than about 1 Hz. The feedback loop frequency of the attitude sensors used in spacecrafts is typically much less than 1 Hz. Accordingly, the graphite cables 30 provide for a sufficient difference between these two frequencies to eliminate the problem of frequency coupling. Consequently, the thrusters and reactions wheels are able to perform their function of controlling the spacecraft attitude and not respond to vibrations in the boom assembly 10, and precious fuel is not wasted due to unnecessary use of the attitude control devices.

The boom 12 can also be formed of graphite to provide the same above-described advantages provided by the cables 30.

Figure 4:
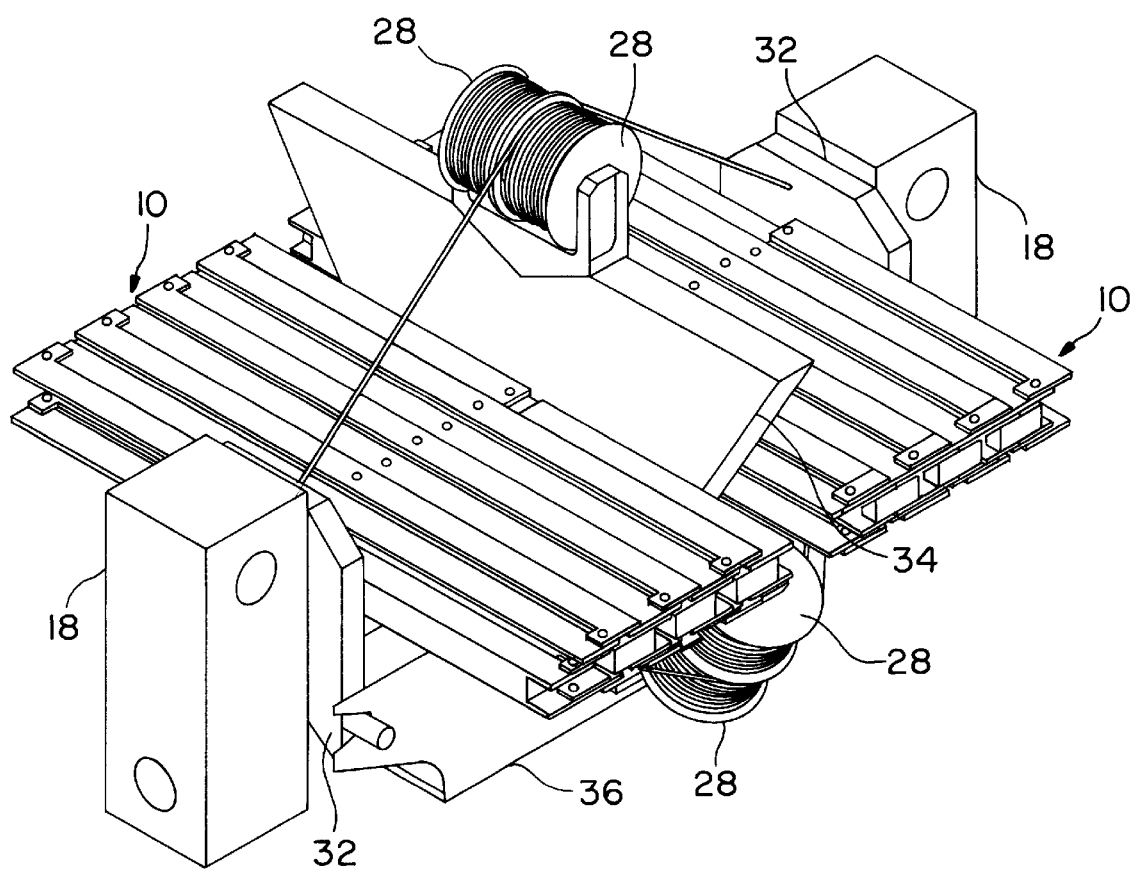
FIG. 4 is top perspective view showing a pair of precision deployable booms in accordance with the invention, each boom having a fixed end mounted to a support structure and a distal end at which an interferometer is mounted.
Figure 5:
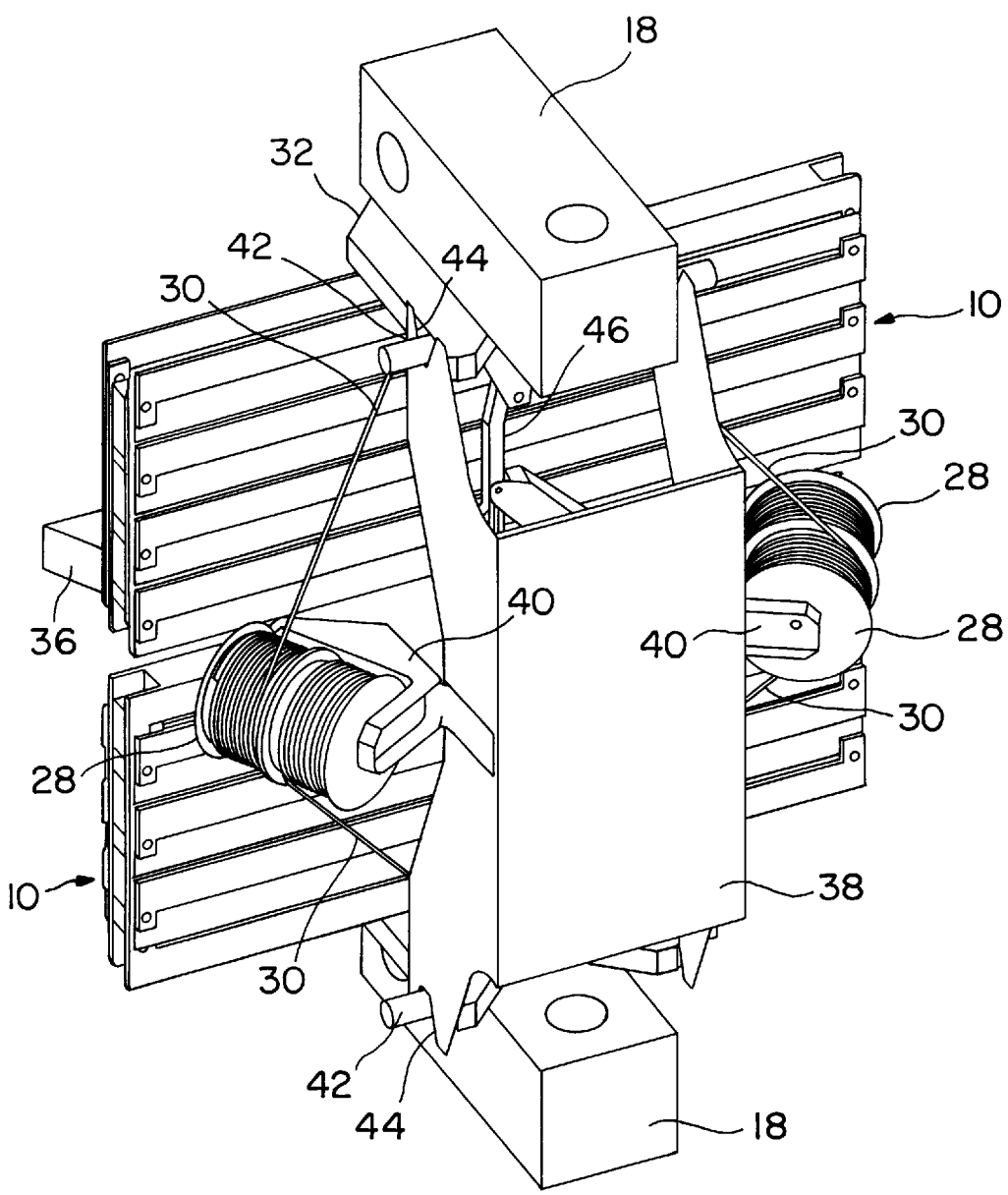
FIG. 5 is a bottom perspective view of the precision deployable booms of FIG. 4.
Figure 6:
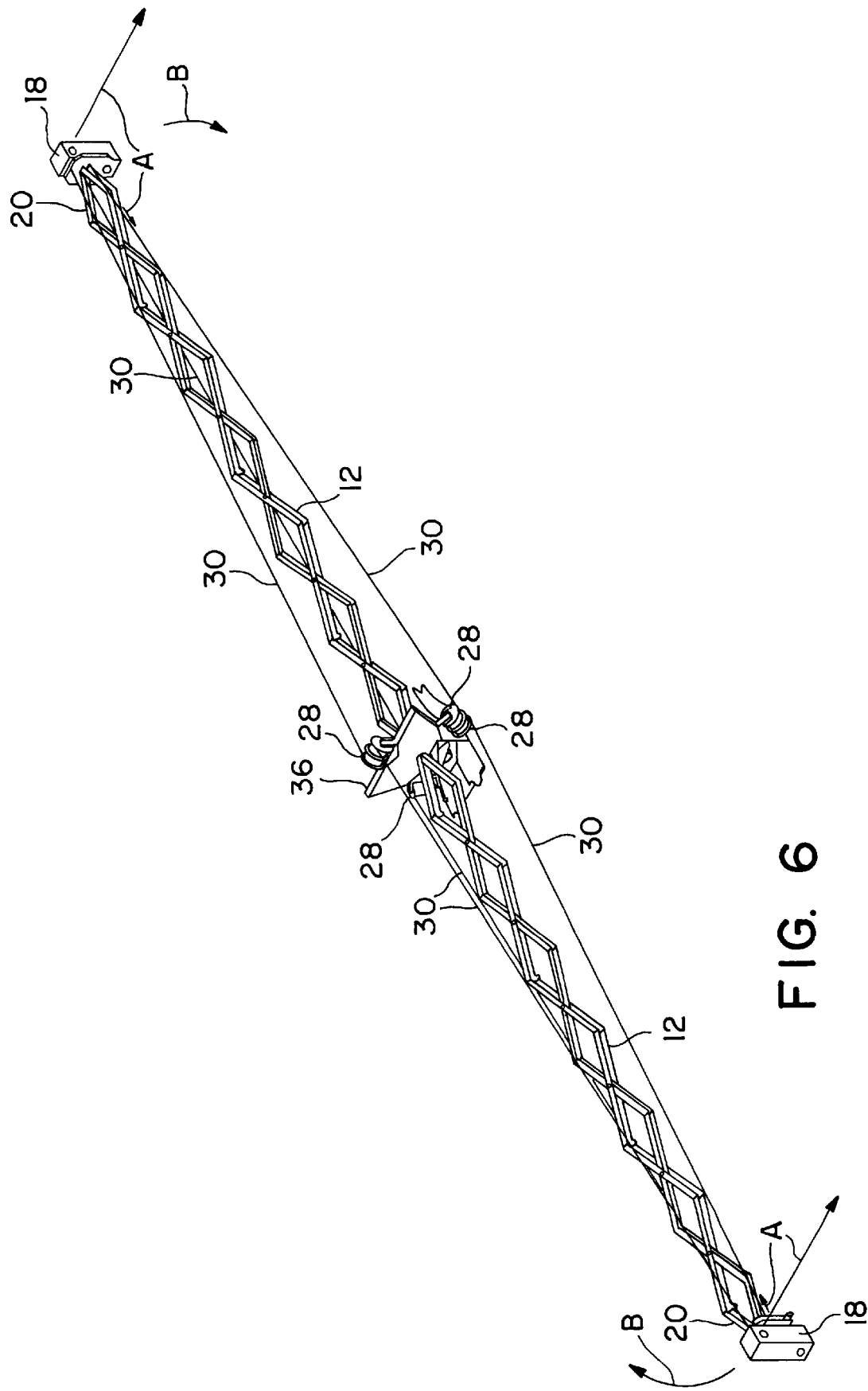
FIG. 6 is top perspective view of the precision deployable booms of FIG. 4, showing each boom fully deployed.

Referring to FIGS. 4–6, more than one deployable boom assembly 10 in accordance with the invention can be mounted to a support structure 36. As shown, a pair of deployable booms 10 are mounted along substantially a common longitudinal axis.

Referring to FIG. 5, the support structure 36 is mounted to a base 38. The cable drums 28 are arranged side-by-side on supporting brackets 40 connected to the base 38. The base 38 can be attached to a surface such as a satellite outer wall. Shear pins 42 provided on the pair of interferometers 18 engage grooves 44 formed at opposite ends of the base 38 in the illustrated stowed position of the boom assemblies 10. A latching mechanism 46 is typically provided to retain the boom assemblies 10 in the stowed position during launch and landing events.

FIG. 6 shows the booms 12 fully deployed. The arrows A indicate the light paths for the interferometers 18. By mounting the interferometers 18 in pairs at the distal ends 20 of the aligned booms 12, it is possible to measure distant planets and solar systems by circularly rotating the booms 12 as represented by arrows B. For changes in aperture size, the length of each boom 12 can be precisely varied. The precise positioning capabilities of the boom 12 enables the interferometers 18 to be positioned the same distance from the support structure 36 to provide uniform circular mapping. In addition, the booms 12 enable the interferometers 18 to be repositioned at substantially any location, for example, if a measurement needs to be precisely repeated.

Figure 8:
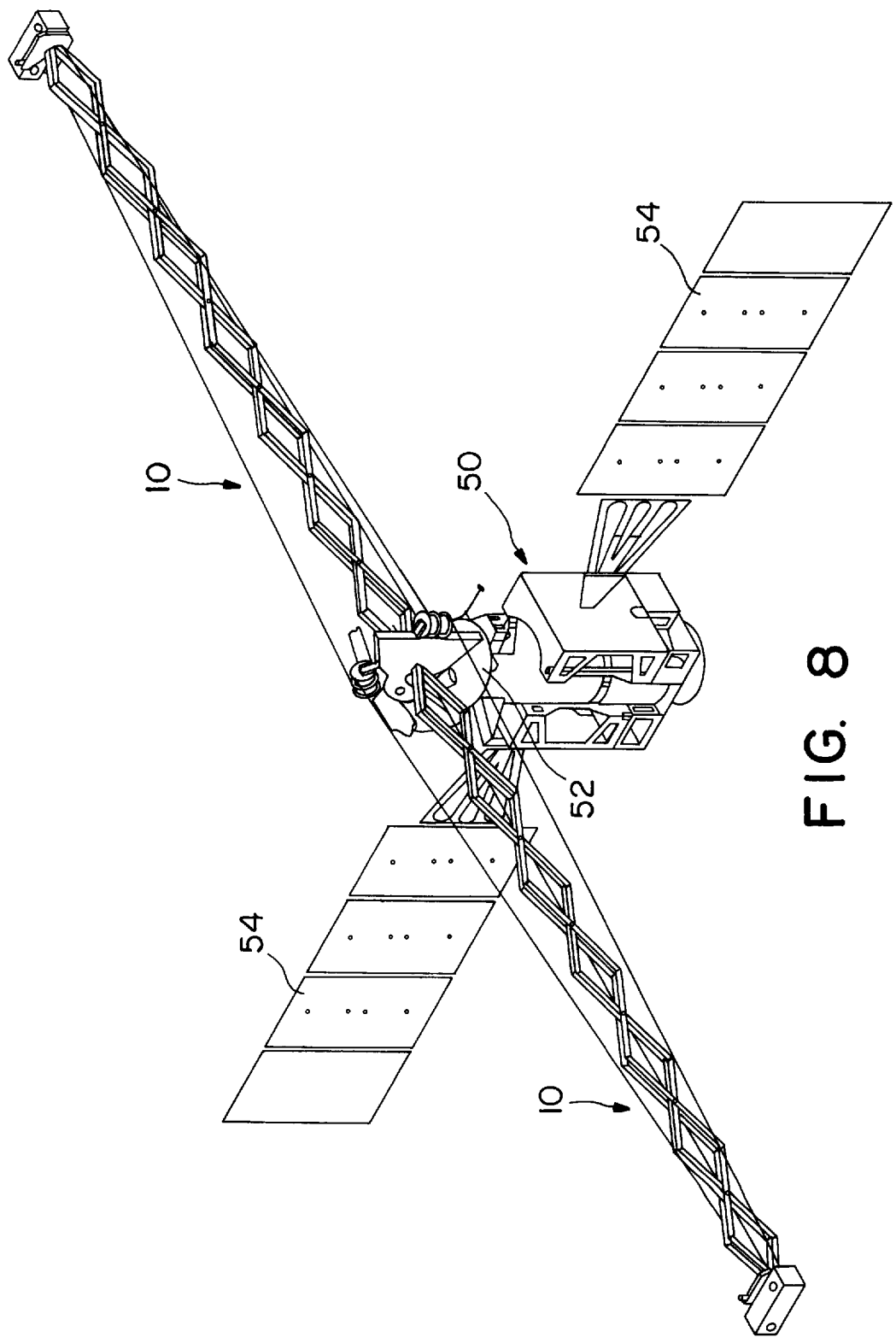
FIG. 8 shows the precision deployable booms of FIG. 6 mounted to a satellite.

FIG. 8 shows the deployed boom assemblies 10 of FIG. 6 as mounted to a base 52 on a satellite 50. A pair of solar panel arrays 54 are also shown mounted to the satellite 50

Other arrangements of two or more deployable boom assemblies in accordance with the invention on a support surface are also possible (not shown). For example, pairs of boom assemblies 10 can be mounted parallel to each other on a support surface, or mounted at an angle relative to each other.

The boom assembly 10 in accordance with the invention has utility for various terrestrial applications that require the precise, repeatable positioning of an object. For example, the boom assembly 10 can be used to deploy antennas and scientific instruments to precise positions.

The boom assembly 10 can be provided in various boom 12 lengths. For example, for space applications, the deployed boom 12 length is typically as much as 25 meters. Other shorter and longer booms 12 are possible. The preloaded, stiff cables 30 in combination with the extension force provided by the scissors booms 12 provide high stability and precise positioning of the boom 12 for a wide range of boom 12 lengths.

Although the present invention has been described in considerable detail with reference to certain preferred versions thereof, other versions are possible. Therefore, the scope of the appended claims should not be limited to the description of the preferred versions contained herein.

What is claimed is:

1. A precision deployable boom assembly for use on a supporting structure, the boom assembly comprising:
    (a) a deployable and retractable boom having a fixed end for fixedly securing through a surface of the supporting structure and a distal end selectively movable relative to the fixed end;
    (b) at least three cables, each cable having a first end connected to the distal end of the boom and a second end;
    (c) cable deployment means comprising three cable drums including said cables, each cable drum defines a continuous, spiral shaped groove along the length of the drum; each cable drum secured to the second end of each cable for selectively deploying and retracting the cables during respective deployment and retraction of the boom, the cable deployment means being securable to the supporting structure;
    (d) deployment assist means for urging the boom to deploy and for producing a tensile pre-load force in each of the cables;
    (e) actuation means comprising three stepping motors, each stepping motor drivingly connected to one of the cable drums for actuating the cable deployment means to selectively vary the length of the cable deployed from the cable deployment means to thereby vary the length of the boom between the fixed end and the distal end; and
    (f) sensor means for sensing the position of the distal end of the boom for driving the cable drums,
    wherein the distal end of the boom is repeatably and stably positionable at substantially any position between a fully deployed and fully retracted position.

2. The boom assembly of claim 1, wherein the cable drums are substantially symmetrically positionable relative to each other on the supporting structure such that the cables extend at approximately the same angle relative to the surface of the supporting structure between the cable drums and the distal end of the boom to form a tripod configuration.

3. The boom assembly of claim 1, wherein the cables have i) a coefficient of thermal expansion of an absolute value of less than about $0.01 \times 10^{-6}$ in/in-°F., and ii) a density of less than about 0.07 lb/in$^3$.

4. The boom assembly of claim 1, wherein the cables are comprised of graphite or nickel-plated graphite.

5. The boom assembly of claim 1, wherein the boom is a scissors boom including a plurality of legs interconnected by hinges, the deployment assist means comprises a plurality of strain energy springs, each spring is disposed in one of the hinges.

6. The boom assembly of claim 1, wherein the boom is comprised of graphite.

7. The boom assembly of claim 1, wherein the boom assembly has (i) a structural frequency of greater than about 1 Hz, (ii) substantially no deadband, and (iii) substantially no hysteresis.

8. A precision deployable boom assembly for use on a supporting structure, the boom assembly comprising:
    a) a deployable and retractable scissors boom having a fixed end for fixedly securing to a surface of the supporting structure and a distal end selectively movable relative to the fixed end, the scissors boom including a plurality of legs interconnected by hinges, and a strain energy spring disposed in a plurality of the hinges to urge the scissors boom to deploy;
    b) three graphite cables, each cable having a first end secured to the distal end of the scissors boom and a second end, the scissors boom producing a tensile pre-load force in each of the graphite cables;
    c) three cable drums for securing to the supporting structure, each cable being secured at the second end to one of the cable drums, each cable drum unwinding and winding one of the graphite cables during respective deployment and retraction of the scissors boom, and each cable drum defining a continuous spiral-shaped groove; and
    d) three stepping motors, each stepping motor being drivingly connected to one of the cable drums to selectively vary the length of the graphite cables deployed from the cable drum to thereby vary the deployed length of the scissors boom between the fixed end and distal end;
    e) wherein the distal end of the scissors boom is (i) positionable at substantially any position between fully deployed and fully retracted positions; (ii) repeatedly positionable at substantially any deployed position; and (iii) substantially positionally stable at any deployed position.

9. The boom assembly of claim 8, wherein the cable drums are substantially symmetrically positionable relative to each other on the supporting structure such that the graphite cables extend at approximately the same angle relative to the surface of the supporting structure between the fixed end and distal end of the boom to form a tripod configuration.

10. The boom assembly of claim 8, further comprising at least one position sensor for sensing the position of the distal end of the scissors boom, the stepping motors are selectively actuable to drive the cable drums based on the sensed position of the distal end so as to deploy or retract the scissors boom.

11. The boom assembly of claim 8, wherein the graphite cables are nickel-plated.

12. The boom assembly of claim 8, wherein the scissors boom is comprised of graphite.

13. The boom assembly of claim 8, wherein the boom assembly has (i) a structural frequency of greater than about 1 Hz; (ii) substantially no deadband; and (iii) substantially no hysteresis.

14. In combination:
   (a) a supporting structure having at least one support surface;
   (b) at least one position deployable boom assembly mounted to the support surface of the supporting structure, each boom assembly comprising:
      (i) a deployable and retractable boom having a fixed end and fixedly secured to the support surface and a distal end selectively movable relative to the fixed end, said distal end equipped with instrumentalities whose successful operation is a function of the position of the distal end from the fixed end;
      (ii) at least three cables, each cable having a first end connected to the distal end of the boom, the cable having a coefficient of thermal expansion of an absolute value of less than about $0.01 \times 0.01 \times 10^{-6}$ in/in–°F., and a density less than about 0.07 lb/in$^3$;
      (iii) cable deployment means secured to said second end of the cable for selectively deploying and retracting the cable during respectively deployment and retraction of the boom, the cable deployment means being secured to the supporting structure;
      (iv) deployment assist means comprising strained energy hinges for urging the boom to deploy and for producing a tensile pre-load force in each of the cables; and
      (v) sensing means for sensing the position of the distal end relative to the fixed end;
      (vi) actuation means for actuating the cable deployment means to selectively vary the length of the cable deployed from the cable deployment means to thereby vary the length of the boom between the fixed end and the distal end, wherein the distal end of the boom is (a) positionable at substantially any position between fully deployed and fully retracted position; (b) repeatably positionable at substantially any deployed position of the boom; and (c) substantially positionally stable at any deployed position; and,
      (vii) wherein the boom assembly has: (a) a structural frequency greater than 1 Hz; (substantially no deadband; (c) substantially no hysteresis.

15. The combination of claim 14, comprising a plurality of boom assemblies mounted to the supporting structure.

16. A spacecraft assembly, comprising:
   a) a spacecraft having at least a first support surface; and
   b) at least one precision deployable boom assembly mounted to the first support surface, each boom assembly comprising:
      i) a deployable and retractable boom having a fixed end fixedly secured to the first support surface and a distal end selectively movable relative to the fixed end;
      ii) three cables each having a first end secured to the distal end of the boom, the cables having a coefficient of thermal expansion of an absolute value of less than about $0.01 \times 10^{-6}$ in/in–°F., and a density of less than about 0.07 lb/in$^3$;
      iii) cable deployment means secured to the second end of the cables for selectively deploying and retracting the cables during respective deployment and retraction of the boom, the cable deployment means being secured to the first support surface;
      iv) deployment assist means for urging the boom to deploy and for producing a tensile pre-load force in each of the cables; and
      v) actuation means for actuating the cable deployment means to selectively vary the length of the cables deployed from the cable deployment means to thereby vary the length of the boom between the fixed end and the distal end;
      vi) wherein the distal end of the boom is (i) positionable at substantially any position between fully deployed and fully retracted positions; (ii) repeatedly positionable at substantially any deployed position of the boom; and (iii) substantially positionally stable at any deployed position.

17. The spacecraft assembly of claim 16, wherein the spacecraft is a satellite.

18. The spacecraft assembly of claim 17, comprising two deployable boom assemblies and the spacecraft further comprises a second support surface, the boom assemblies are mounted to the first and second support surfaces such that the booms lie substantially along a common axis, and the distal ends of the booms face in opposite directions.

19. The spacecraft assembly of claim 16, wherein the boom assembly has (i) a structural frequency of greater than about 1 Hz; (ii) substantially no deadband; and (iii) substantially no hysteresis.

20. A position deployable scissors boom assembly for use on a supporting structure the boom assembly having a fixed end and a distal end, said assembly capable of precise positioning of the distal end at a predetermined position, said distal end being equipped with instrumentalities whose successful operation depend on the position of the distal end relative to the fixed end, said boom assembly comprising:
   (a) sensing means for sensing the predetermined position;
   (b) a series of cable means and including associated drum means for expanding and retracting said boom assembly multi-directionally by winding and unwinding the cable means on said drum means, said cable means comprising:
      (i) a first and second one of said cable means and drum means for expanding and retracting the boom assembly axially and arcuately within a plane horizontal to the support structure;
      (ii) a third one of said cable means and drum means for expanding and retracting the boom assembly in a plane vertical to said support structure, said three cable means and drum means residing in a plane normal to the axial direction of the boom assembly in which said first and second cable means and drum means are oppositely disposed on either side of the boom and the third cable means and drum means positioned midway therebetween, and (c) drive means responsive to said sensing means for actuating the drum means to position the distal end at said predetermined position.

* * * * *